Dec. 17, 1940.         F. T. COURT         2,225,157
VEHICLE SUPPORTING STAND
Filed Dec. 12, 1938
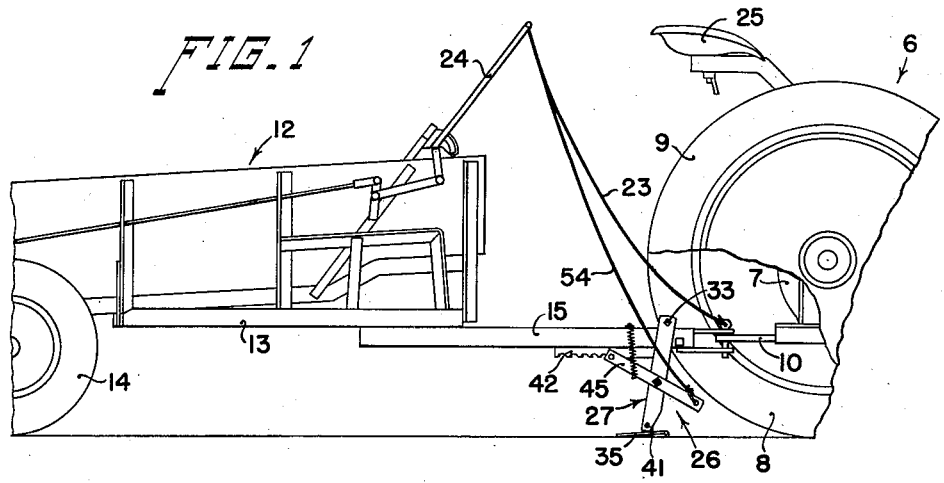
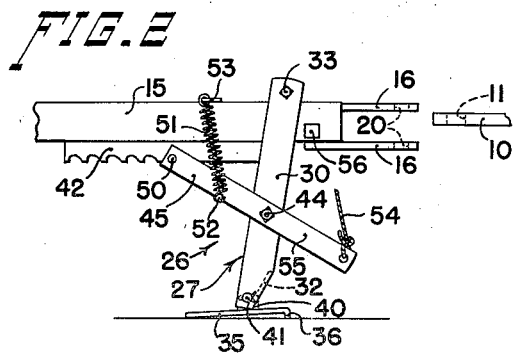
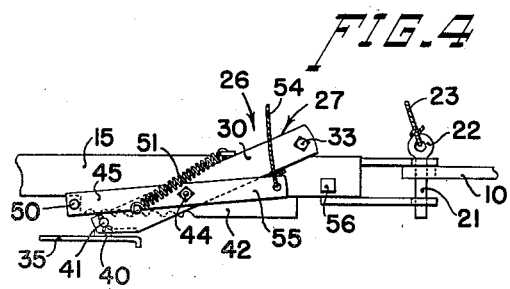
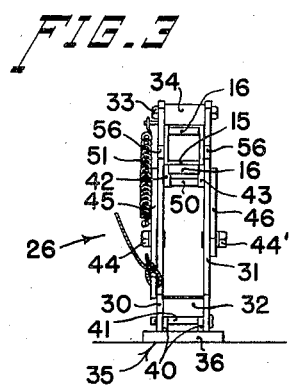
INVENTOR.
FRANK T. COURT.
BY
ATTORNEYS Patented Dec. 17, 1940

2,225,157

UNITED STATES PATENT OFFICE 2,225,157

VEHICLE SUPPORTING STAND

Frank T. Court, Moline, Ill., assignor to Deere & Company, Moline, Ill., a corporation of Illinois Application December 12, 1938, Serial No. 245,174

11 Claims. (Cl. 280—33.4)

The present invention relates to devices for supporting a vehicle that is normally carried on a propelling tractor, and has as its principal object the provision of a new and improved self-locking jack stand that is adjustable to support the vehicle at various heights above the ground.

Another object is to provide a supporting stand that is carried on the draft tongue of the vehicle and is normally latched up on the vehicle in a raised position when not in use.

A further object of the present invention is to provide a supporting stand adapted to raise the vehicle slightly when it is being coupled to the tractor to bring the draft member on the vehicle into register with the hitch means on the tractor.

Still another object is to provide a supporting stand that can be raised or lowered between operative and inoperative positions by pulling on a control rope, thereby enabling the operator to disconnect the vehicle from the tractor without leaving his station on the tractor.

These and other objects and advantages of the present invention will become apparent after a consideration of the following detailed description of a preferred embodiment thereof, reference being had to the appended drawing, in which Figure 1 is a side elevation of my invention as applied to a tractor-mounted manure spreader of the type having supporting wheels at the rear end thereof, the near wheel of the tractor being partially cut away to show the details of construction more clearly;

Figure 2 is an enlarged side view of the supporting stand in operative position;

Figure 3 is a front elevation of the device shown in Figure 2; and

Figure 4 is a view similar to Figure 2, but showing the stand latched up in raised or inoperative position.

Referring now to the drawing, the reference numeral 6 indicates a conventional tractor having a body 7 supported at its rear end on drive wheels 8, 9, and provided with a rearwardly extending drawbar 10 having a hole 11 formed therein. Hitched to the tractor is a vehicle 12 of the semi-trailing type comprising a body 13 that is supported at its rear end on ground engaging wheel means 14, and its front end is supported on the tractor drawbar, as will be described. Although my invention is applicable to any tractor supported vehicle, I have chosen to describe this embodiment as applied to a manure spreader.

Fixedly secured to the front end of the frame 13 is a forwardly extending draft tongue 15, preferably in the form of a box beam, and fixed to the top and bottom sides of the forward end of the draft tongue 15 are two clevis bars 16 that are perforated at 20. The draft tongue 15 is connected with the drawbar 10 by aligning the perforations 20 with the hole 11 and passing a king bolt 21 therethrough, as shown in Figures 1 and 4. The king bolt 21 is preferably made with an eye 22 through which a rope 23 is passed and then tied, the other end of the rope being fastened to a control lever 24 or other projection on the manure spreader body within convenient reach of the operator seated on the tractor seat 25.

Carried at the front end of the draft tongue 15 is a jack stand, indicated in its entirety by the reference numeral 26, and including a leg 27 comprising a pair of side members 30, 31 disposed on either side of the draft tongue and connected at their lower ends by a cross piece 32. The upper ends of the side members 30, 31 are connected by a bolt 33 that is passed through and journaled in a sleeve 34 fixed, as by welding, to top side of the draft tongue 15. Thus, the leg 27 is pivotally connected to the draft tongue for vertical swinging about the axis of the transverse bolt 33. Pivotally connected to the lower end of the leg 27 is a foot 35 consisting of a flat plate having the front edge thereof bent downwardly, as at 36, in order to grip the soil when the tractor is backed up, as will be described in detail presently. The foot 35 is provided with a pair of lugs 40 having perforations adapted to register with perforations in the ends of the side members 30, 31, and a pin 41 is passed through the aligned holes and secured by a cotter key or the like.

The leg 27 is locked in its lowered position by holding means on the draft tongue comprising a pair of laterally spaced parallel ratchet or rack bars 42, 43, fixed to the under side of the draft tongue 15. A locking member or brace consisting of lever arms 45, 46 that are rigidly connected at their ends by a locking pin 50, is pivotally connected to the two members 30, 31 by bolts 44, 44' intermediate the ends of the arms 45, 46, and the locking pin 50 is adapted to engage the teeth of the ratchet bars 42, 43. A spring 51 is fastened to a pin 52 on the lever arm 45 between the pivot 44 and the pin 50 and is anchored to a projection 53 on the draft tongue 15 for the purpose of yieldingly holding the locking member in engagement with the ratchet bars 42, 43 when the stand is in use. The locking member is disengaged from the ratchet bars 42, 43 and the leg 27 is swung up to raised position by means of a trip rope 54 that is fastened to an extension 55 of the lever arm 45 and is secured to the control lever 24 on the manure spreader together with the king bolt rope 23. A limit stop 56 on the draft tongue 15 limits the forward swinging movement of the leg 27 and prevents the stand from collapsing if the tractor is backed up too far with the foot down in contact with the ground.

When the leg 27 is up in the raised position shown in Figure 4, it is latched by the locking pin 50 which engages and grips the rear ends of the ratchet bars 42, 43. This latching effect is caused by the action of the spring 51 urging the locking device to rotate in a clockwise direction about the pivot 44, while the leg 27 tends to swing downwardly by gravity in a counterclockwise direction about the pivot 33. The resulting forward movement of the locking pin 50 is stopped against the ends of the ratchet bars 42, 43, and the stand is retained until released by a quick jerk on the trip cord 54 which lifts the pivot bolt 44 thereby releasing the pressure of the locking pin 50 against the bars 42, 43, whereupon the pin 50 drops down over the ends of the ratchet bars and the weight of the stand then causes it to swing to the ground, while the spring 51 holds the pin 50 against the ratchet bars 42, 43. The tractor is then backed up a few inches, causing the flange 36 to dig into the ground, and the stand to pivot about the pin 33, bringing the leg 27 toward a vertical position in which it is held by the locking member 45 and ratchet bars 42, 43, so that the weight of the spreader is taken off the drawbar 10. The king bolt 22 can then be pulled out by pulling on the rope 23, and the tractor is free to be driven away. The ratchet and locking member will hold the stand in a fixed position until the tractor is again hitched to the spreader.

To couple the tractor to the spreader, the tractor is backed into position and the king bolt 22 dropped in place. The tractor is then backed slightly to release the pressure of the locking pin 50 on the ratchet teeth, and the control rope 54 given a quick jerk to disengage the locking pin and bring the leg up to carrying position. The locking pin 50 automatically catches on the ends of the ratchet bars 42, 43 to hold the leg up as previously described.

If it should happen that the foot 35 has settled into soft ground while standing, or if it is desired to hitch the draft tongue to another drawbar higher above the ground, it is necessary only to push rearwardly on the draft tongue 15 with the drawbar or any suitable part of the tractor, raising the stand another tooth or two on the ratchet to bring the clevis bars 16 into register with the drawbar. On the other hand, if the tractor drawbar is too low to properly register with the tongue, the latter can be lowered by backing against the tongue slightly until the pin can be disengaged from the ratchet by pulling on the rope 54 and then allowing the pin to drop into the next ratchet notch as the tongue sags down. Thus it is evident that coupling and uncoupling operations can be effected by manipulation of the tractor and the control ropes 23, 54 without the necessity of the operator leaving the tractor seat.

What I claim as my invention is:

1. For use with a vehicle having a draft member, a stand for supporting said vehicle on the ground comprising, in combination, a leg pivotally connected to said draft member for vertical swinging between a raised transport position and a lowered ground engaging position, a locking member pivotally connected intermediate of its ends to said leg, holding means on the draft member engageable by one end of said locking member when said leg is in either of said positions for securing the leg in position, and means connected with the other end of said locking member for disengaging said locking member from said holding means.

2. For use with a vehicle having a draft member, a stand for supporting said vehicle on the ground comprising, in combination, a leg pivotally connected to said draft member for vertical swinging between a raised transport position and a lowered ground engaging position, a locking member pivotally connected intermediate of its ends to said leg, spring means connected with said locking member and anchored to said draft member for yieldingly urging one end of said locking member against said draft member, holding means on the draft member adapted to engage the one end of said locking member when said leg is in either of said positions for securing the leg in place, and means connected with the other end of said locking member for lifting the locking member out of engagement with said holding means.

3. For use with a vehicle having a draft member, a stand for supporting said vehicle on the ground comprising, in combination, a leg pivotally connected to said draft member for vertical swinging between a raised transport position and a lowered ground engaging position, a ratchet member fixed to said draft member, locking means on said leg engageable with said ratchet member when said leg is raised to hold the leg in transport position, said locking means being engageable with said ratchet member when the leg is lowered to hold the leg in ground engaging position, and control means for disengaging said locking means from said ratchet member and swinging the leg from one position to the other.

4. A stand for supporting a vehicle comprising, in combination, a leg pivotally connected to the vehicle for vertical swinging movement between a raised transport position and a lowered ground engaging position, a latch member, locking means engageable with said latch member for holding said leg in ground engaging position with said vehicle supported optionally at one of several heights above the ground, said locking means being engageable with said latch member for holding said leg in raised transport position, and control means for disengaging said locking means from said latch member and swinging said leg from one position to the other.

5. For use with a vehicle having a draft member, a stand for supporting said vehicle on the ground comprising, in combination, a leg pivotally connected to said draft member for vertical swinging between a raised transport position and a lowered ground engaging position, a ratchet member fixed to said draft member, a locking member pivotally connected to said leg and engageable with said ratchet member to hold the leg in ground engaging position with said draft member supported at any of several heights above the ground, said locking member being engageable with said ratchet member to hold said leg in raised transport position, and control means connected with said locking member for disengaging the same from said ratchet member and swinging said leg from one position to the other.

6. A jack for supporting the tongue of a two wheel trailer comprising a supporting standard movably connected to said tongue, a spring controlled lock on the standard, a rack on the tongue with which said lock cooperates to hold said standard in different positions relative to said tongue to support the latter at different heights above the ground, the teeth of said rack being inclined toward one end of said rack to permit said lock to ratchet thereon in one direction, and a stop on said rack adjacent the other end to hold said lock and said standard in raised position.

7. A jack for supporting the tongue of a two wheel trailer comprising a supporting standard movably connected to said tongue, a lock on said standard, a rack on said tongue engageable with said lock, a spring connected to said lock to hold the latter in engagement with said rack, and a stop on said rack engageable with said lock when the standard is in inoperative position, said spring being energized when the standard is in said inoperative position to secure said lock in engagement with said stop.

8. For use with a vehicle having a draft member, a stand for supporting said vehicle on the ground comprising, in combination, a leg pivotally connected to said draft member for vertical swinging between a raised transport position and a lowered ground engaging position, a locking member pivotally connected intermediate of its ends to said leg, a toothed rack mounted on said draft member and engageable by one end of said locking member when said leg is in either of said positions, a control rope connected with the other end of said locking member and operable to disengage the locking member from said rack and to swing said leg from ground engaging to transport position, and means yieldingly urging said locking member into engagement with said rack when said leg is in transport position.

9. In combination with a supporting frame, a device comprising a leg, pivot means connecting said leg with said frame for vertical swinging, said leg being biased to swing downwardly relative to the frame, a locking member pivotally connected with said leg and biased to swing upwardly relative thereto, the free end of said locking member tending to move toward said pivot means when said leg tends to swing downwardly from raised position, and an abutment on said frame spaced from said pivot means and engageable by the free end of said locking member to limit the movement of the same, thereby locking said leg in raised position.

10. A stand for supporting a vehicle comprising, in combination, a leg, pivot means connecting said leg with said vehicle for vertical swinging between a ground engaging position and a raised transport position, said leg tending to swing downwardly by gravity from transport position, a locking member pivotally connected with said leg for relative vertical swinging, spring means connected with said locking member for urging the same in one direction relative to said leg whereby the free end of said locking member tends to move toward said pivot means when said leg tends to swing downwardly, and an abutment on said vehicle engageable by the free end of said locking member to limit movement of the same towart said pivot means, thereby locking said leg in raised transport position.

11. A stand for supporting a vehicle comprising, in combination, a leg pivotally connected to the vehicle for vertical swinging movement between a raised transport position and a lowered ground engaging position, a latch member, locking means engageable with said latch member for holding said leg in ground engaging position with said vehicle supported optionally at one of several heights above the ground, said locking means being engageable with said latch member for holding said leg in raised transport position, a spring tending to hold said locking means in engagement with said latch means, and control means for disengaging said locking means from said latch member against the tension of said spring and swinging said leg from one position to the other.

FRANK T. COURT.